US008095519B2

(12) United States Patent
Delia et al.

(10) Patent No.: US 8,095,519 B2
(45) Date of Patent: Jan. 10, 2012

(54) MULTIFACTOR AUTHENTICATION WITH CHANGING UNIQUE VALUES

(75) Inventors: Wayne M. Delia, Poughkeepsie, NY (US); Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 12/336,189

(22) Filed: Dec. 16, 2008

(65) Prior Publication Data

US 2010/0153451 A1 Jun. 17, 2010

(51) Int. Cl.
*G06F 7/00* (2006.01)
*G06Q 20/00* (2006.01)
(52) U.S. Cl. ........... 707/703; 707/781; 707/783; 705/44
(58) Field of Classification Search .................. 707/703, 707/781, 783; 705/44
See application file for complete search history.

(56) References Cited

U.S. PATENT DOCUMENTS

| 5,629,981 | A | 5/1997 | Nerliker | |
|---|---|---|---|---|
| 2003/0208684 | A1* | 11/2003 | Camacho et al. | 713/186 |
| 2006/0253894 | A1 | 11/2006 | Bookman et al. | |
| 2007/0174082 | A1 | 7/2007 | Singh | |
| 2008/0103972 | A1* | 5/2008 | Lanc | 705/44 |
| 2008/0162338 | A1* | 7/2008 | Samuels et al. | 705/38 |
| 2010/0094754 | A1* | 4/2010 | Bertran et al. | 705/44 |

\* cited by examiner

*Primary Examiner* — Etienne LeRoux
*Assistant Examiner* — Cindy Nguyen
(74) *Attorney, Agent, or Firm* — Schmeiser, Olsen & Watts; John Pivnichny

(57) ABSTRACT

A method of authentication includes the steps of providing a transaction service provider having a secure server; providing a user; requesting access authorization to the server of the service provider by the user, the server storing a set of use parameters obtained from the authorization access request, the use parameters including at least several prior location coordinates, methods of access, transaction information and access hardware used during the authentication to be used by the transaction service provider in subsequent requests by the user to access the server, the use parameters used in the authentication to be continually updated with the most recent data.

10 Claims, 2 Drawing Sheets

MULTIFACTOR AUTHENTICATION WITH CHANGING UNIQUE VALUES

FIELD OF THE INVENTION

This invention relates generally to the field of user authentication for system access, and more particularly to a multifactor authentication having changing unique values.

BACKGROUND OF THE INVENTION

Payment transaction processing systems, like other electronic data processing systems, are susceptible to fraud. Such fraud can cause problems to users of such systems, often compromising sensitive information and promoting distrust of such systems. Such fraud also imposes additional costs on the entities dependent on the system, such as banks, credit card companies, online retail stores, etc. who bear the brunt of the fraud. Although fraud detection and prevention mechanisms are in place, improvements to the security of such systems pay for themselves by preventing additional fraudulent practices.

If a user typically shops in a particular area, a purchase several thousand miles away can flag the system to a possible fraudulent transaction. Similarly, if the user typically uses a credit card only for gasoline purchases, if the card is used to purchase an expensive plasma screen TV, the transaction can again flag the system. In general, modern systems use various data points to develop a trustworthiness score for the transaction.

U.S. Pat. No. 5,629,981 (Nerlikar) discloses a system and method of attaching transaction location information to a secure transaction, but this information is not used in authenticating a user to access the system to enter the secure transaction. Nerlikar relies exclusively on a RFID tag to determine location. Nerlikar teaches transmission of a transaction with authenticated receipt based on location, but not authenticating a user based on correlation of locations of previous transactions.

U.S. Published Patent Application No. 2006/0253894 (Bookman et. al.) discloses a secure mobile computing platform which bases authentication on a selected trust model, but does not authenticate a user based on correlation with previous times and locations of transactions.

U.S. Published Patent Application No. 2007/0174082 (Singh) discloses an authentication system and method which uses location data to generate a location score providing a confidence value for authentication. There is no mention of a combination of time and location data correlated with a history stored on an application server and a transaction client.

SUMMARY OF THE INVENTION

Briefly stated, a method of authentication includes the steps of providing a transaction service provider having a secure server; providing a user; requesting access authorization to the server of the service provider by the user, the server storing a set of use parameters obtained from the authorization access request, the use parameters including at least several prior location coordinates, methods of access, transaction information and access hardware used during the authentication to be used by the transaction service provider in subsequent requests by the user to access the server, the use parameters used in the authentication to be continually updated with the most recent data.

According to an embodiment of the invention, a method for multifactor authentication having changing unique values includes the steps of: (a) maintaining an access history database of transactions made by a user; (b) maintaining a client device history log on an input device; (c) receiving a request for a transaction from the input device; (d) causing the input device to select a subset from the client device history log; (e) sending the subset along with the request to an authentication server; (f) comparing the subset to the access history database; (g) proceeding with the transaction when a match is found between the subset and the access history database; and (h) terminating the transaction when no match is found between the subset and the access history database.

According to an embodiment of the invention, a computer program product for multifactor authentication having changing unique values includes a computer readable medium; first program instructions to maintain an access history database of transactions made by a user; second program instructions maintain a client device history log on an input device; third program instructions to receive a request for a transaction from the input device; fourth program instructions to cause the input device to select a subset from the client device history log; fifth program instructions to send the subset along with the request to an authentication server; sixth program instructions to compare the subset to the access history database; seventh program instructions to proceed with the transaction when a match is found between the subset and the access history database; eighth program instructions to terminate the transaction when no match is found between the subset and the access history database; wherein said first, second, third, fourth, fifth, sixth, seventh, and eighth program instructions are stored on said computer readable media.

According to an embodiment of the invention, a system which performs multifactor authentication with changing unique values includes an access history database of transactions made by a user; a client device history log on an input device; means for receiving a request for a transaction from the input device; means for causing the input device to select a subset from the client device history log; means for sending the subset along with the request to an authentication server; means for comparing the subset to the access history database; means for proceeding with the transaction when a match is found between the subset and the access history database; and means for terminating the transaction when no match is found between the subset and the access history database.

The invention is generally related to user authentication for system access to secure transactions. The invention is specifically related to authentication criteria consisting of the combination of static identification data (account, password, input device serial number, biometric identification) and dynamic data (GPS location, date, time) unique to the user's prior transaction history.

DETAILED DESCRIPTION OF THE PREFERRED EMBODIMENT

Figure 1:
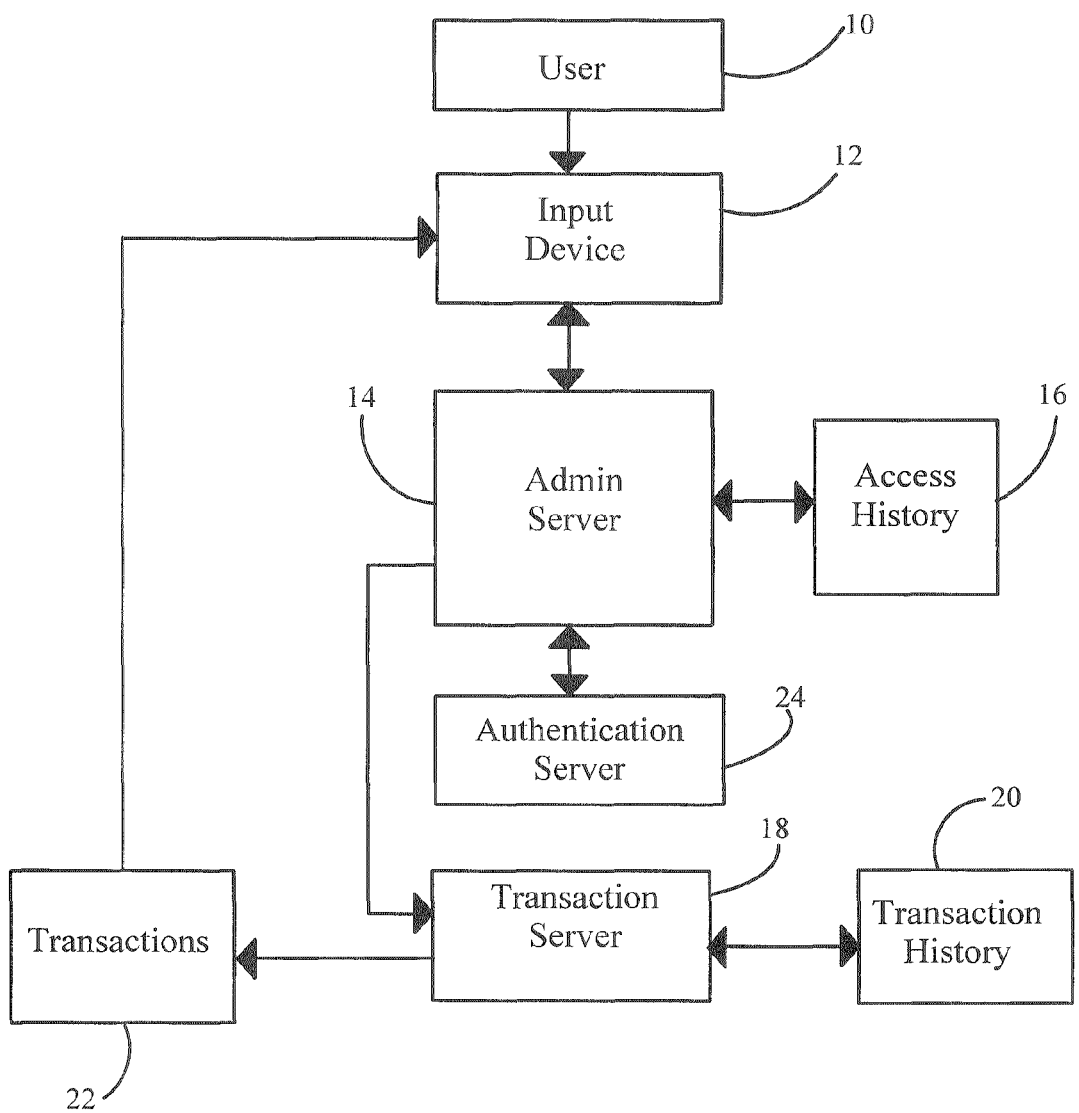
FIG. 1 shows a overview of the system used to authenticate a transaction according to an embodiment of the invention.

In general, the invention is a system of authenticating a potential user of a secure transaction based on the history of parameters (time, method, and location coordinates) of prior transactions. When a new account is established, the user's devices can be registered with the system and seeded with a randomized list of pseudo-history of transactions known both to the client device and the secure server. The secure transaction service provider then maintains a database of account ID numbers, access dates, access times, access methods (i.e., information identifying the user's cell phone, PDA, or web access from a specific computer), transaction times, and transaction locations via GPS signals.

A valid user is able to specify his account ID and perhaps a password from a specific device, so the user can be authenticated by comparing the history of prior transactions (date/time and location) which have been made from the specific device. Thus, unauthorized access from other devices which do not retain any history of transaction parametric data are not possible.

For example, a hacker can acquire traditional account credentials through keylogging, eavesdropping, or screen shot techniques. These compromised account credentials are useless to access the account from any other device, which presumably would not contain any history of prior transactions.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a user 10 inputs a secure transaction request via an input device 12, which could be a PDA, cell phone, dedicated machine, etc. Input device 12 sends an authentication request to access services to an administrative server 14 along with a subset (i.e., some or all) of the transaction history from the client device history log which is kept at input device 12, either in memory or in a direct access storage device. Before the transaction is processed on behalf of the user, the access attempt is authenticated. The authentication request typically contains usual security data such as password and account identification, and may include additional security data in the form of biometric identification such as a thumbprint.

Administrative server 14 passes the authentication request on to an authentication server 24, which handles authenticating the request. Authentication server 24 receives the request for authentication along with the subset of the transaction history on input device 12. Authentication server 24 compares the subset to the user's access history from an access history database 16 maintained by administrative server 14. If the input device 12 subset matches the access history database 16 in administrative server 14, the request is authenticated, and the administrative server 14 instructs a transaction server

18 to proceed with the transaction as shown in block 22. Transaction server 18 also ensures that the transaction history, e.g., the record date, time, location, device ID, and transaction ID, is recorded in both a transaction history database 20 and in the client device history log in input device 12.

Transaction server 18 could be on the same computer as authentication server 24, or could be an entirely different computer at a different location. That is, two applications (authentication and transaction processing) could be running on the same computer, or the two applications could each be running on their own computer, in which case the transaction is transmitted from authentication server 24 to transaction server 18 via administrative server 14.

The role of administration server 14 is to execute an application which determines if a transaction request is authorized. A common example would be a bank balance inquiry transaction request which first needs to pass a verification operation carried out by an application on an authentication server. The transaction request is attached to the account and PIN entered by the user requesting the transaction. Before the transaction is processed, the authentication server must verify that the identification credentials supplied are sufficient to proceed with the transaction.

Figure 2:
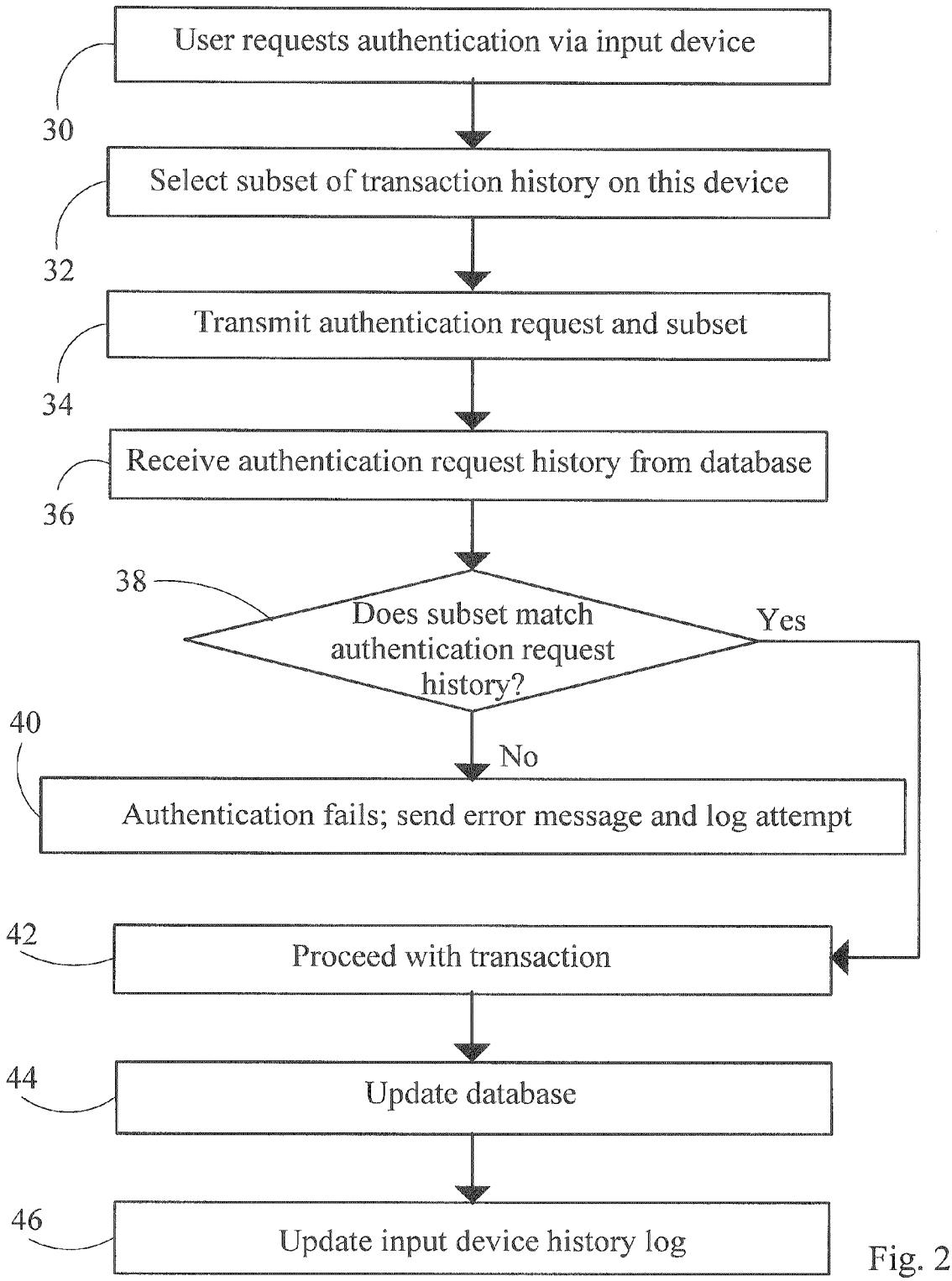
FIG. 2 shows a flow chart of the authentication process according to an embodiment of the present invention.

Referring to FIG. 2, a method according to an embodiment of the present invention is shown. In step 30, a user requests authentication from admin server 14 using input device 12 having transaction history in memory or direct access storage devices. In step 32, a subset (all or some) of transaction history on this device is selected. In step 34, the authentication request and transaction history are transmitted to admin server 14. In step 36, authentication server 24 receives the access history database 16 from admin server 14. In step 38, authentication server 24 determines if the input device transaction history matches the admin server history, and if not, in step 40 the authentication fails, an error message is sent and the attempt is logged. If the request is authenticated in step 38, then in step 42, the transaction proceeds, after which the database 16 is updated in step 44 and the input device history log in input device 12 is updated.

Referring also to Tables 1 and 2, below, an example of an embodiment of the present invention is shown. An Authentication request to access services on www.chase.com is made from device with serial number 7003021, account waynedelia, password <passwd>, biometric identification <thumbprint>. A subset of previous access transactions for Chase Bank, Inc. are extracted from the client device history log file (Table 1) and transmitted to the Chase authentication server. Comparison of the records from the client device history log with the authentication server master database (access history database 16) determines authentication. Table 2 shows an example of the records in access history database 16.

The method of the present invention prevents unauthorized use as follows: Compromised primary authentication access parameters (i.e. account/password or biometric info) entered through another device by a hacker, eavesdropper, etc. are restricted because the invalid input device does not match the expected transaction history subset with the previous transaction date, time, and location stored on the authentication server.

TABLE 1

Device Transaction History Log File (encrypted) on client input device.

| Account | Passwd | Biometric ID | Date | Time | Loc | Service Type | Service Location |
|---|---|---|---|---|---|---|---|
| waynedelia | <passwd> | <thumb print> | 2008.10.01 | 15:32 | <loc> | Transfer | www.chase.com |
| waynedelia | <passwd> | <thumb print> | 2008.10.05 | 08:17 | <loc> | Withdraw | www.chase.com |
| Deliaw | <passwd> | <thumb print> | 2008.10.07 | 12:25 | <loc> | Inquiry | www.hvfcu.org |
| waynedelia | <passwd> | <thumb print> | 2008.10.12 | 14:05 | <loc> | Deposit | www.chase.com |

TABLE 2

Authentication History Log Table (encrypted) on service provider's administration server database for service provider Chase Bank, Inc.

| Device ID | Account | Passwd | Biometric ID | Date | Time | Loc | Service Type | Service Location |
|---|---|---|---|---|---|---|---|---|
| 7003021 | waynedelia | <passwd> | <thumb print> | 2008.10.01 | 15:32 | <loc> | Transfer | www.chase.com |
| 7003021 | waynedelia | <passwd> | <thumb print> | 2008.10.05 | 08:17 | <loc> | Withdraw | www.chase.com |
| 6453827 | edkelley | <passwd> | <thumb print> | 2008.10.08 | 07:13 | <loc> | Withdraw | www.chase.com |
| 7003021 | waynedelia | <passwd> | <thumb print> | 2008.10.12 | 14:05 | <loc> | Deposit | www.chase.com |

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for multifactor authentication having changing unique values, said method comprising:

maintaining an access history database of prior transactions made by a user;

maintaining a client device history log on an input device, said client device history log comprising previous transactions made by a user;

receiving a request for a new transaction from the input device;

causing the input device to select a subset of the previous transactions from the client device history log;

ascertaining a match between (i) the selected subset of the previous transactions from the client device history log in the input device and (ii) a subset of the prior transactions in the access history database;

in response to said ascertaining the match, proceeding with the new transaction.

2. The method of claim 1, wherein said proceeding with the new transaction comprises:

updating the client device history log in the input device with a record of the new transaction; and updating the access history database with the record of the new transaction.

3. A method for multifactor authentication having changing unique values, comprising the steps of:

maintaining an access history database of transactions made by a user;

maintaining a client device history log on an input device;

receiving a request for a transaction from the input device;

causing the input device to select a subset from the client device history log;

sending the subset along with the request to an authentication server;

comparing the subset to the access history database;

proceeding with the transaction when a match is found between the subset and the access history database, wherein the step of proceeding further comprises the steps of: updating the client device history log in the client device with a record of the transaction, and updating the access history database with the record of the transaction; and terminating the transaction when no match is found between the subset and the access history database, wherein the access history database includes, for each transaction, a device ID, an account, a password associated with the account, a date of the transaction, a time of the transaction, a location of the transaction, a service location, a service type, and a biometric ID of the user.

4. The method of claim 1, wherein the access history database includes, for each prior transaction in the access history database: a device ID of the input device, an account, a password associated with the account, a date of said each prior transaction, a time of said each prior transaction, a location of said each prior transaction, a service location, a service type, and a biometric ID of the user.

5. A computer program product, comprising a computer readable physically tangible storage device having a computer readable program code stored therein, said program code configured to be executed by a computer processor to implement a method for multifactor authentication having changing unique values, said method comprising:

maintaining an access history database of prior transactions made by a user;

maintaining a client device history log on an input device, said client device history log comprising previous transactions made by a user;

receiving a request for a new transaction from the input device;

causing the input device to select a subset of the previous transactions from the client device history log;

ascertaining a match between (i) the selected subset of the previous transactions from the client device history log in the input device and (ii) a subset of the prior transactions in the access history database;

in response to said ascertaining the match, proceeding with the new transaction.

6. The computer program product of claim 5, wherein said proceeding with the new transaction comprises:

updating the client device history log in the input device with a record of the new transaction; and updating the access history database with the record of the new transaction.

7. The computer program product of claim 5, wherein the access history database includes, for each prior transaction in the access history database: a device ID of the input device, an account, a password associated with the account, a date of said each prior transaction, a time of said each prior transaction, a location of said each prior transaction, a service location, a service type, and a biometric ID of the user.

8. A system comprising a computer processor and a computer readable memory unit coupled to the processor, said memory unit containing instructions configured to be executed by the processor to implement a method for multifactor authentication having changing unique values, said method comprising:

maintaining an access history database of prior transactions made by a user;

maintaining a client device history log on an input device, said client device history log comprising previous transactions made by a user;

receiving a request for a new transaction from the input device;

causing the input device to select a subset of the previous transactions from the client device history log;

ascertaining a match between (i) the selected subset of the previous transactions from the client device history log in the input device and (ii) a subset of the prior transactions in the access history database;

in response to said ascertaining the match, proceeding with the new transaction.

9. The system of claim 8, wherein said proceeding with the new transaction comprises:

updating the client device history log in the input device with a record of the new transaction; and updating the access history database with the record of the new transaction.

10. The system of claim 8, wherein the access history database includes, for each prior transaction in the access history database: a device ID of the input device, an account, a password associated with the account, a date of said each prior transaction, a time of said each prior transaction, a location of said each prior transaction, a service location, a service type, and a biometric ID of the user.

* * * * *